United States Patent
Namadevan et al.

(10) Patent No.: US 11,092,024 B2
(45) Date of Patent: Aug. 17, 2021

(54) HEAT PIPE IN TURBINE ENGINE

(71) Applicant: General Electric Company, Schenectady, NY (US)

(72) Inventors: Arvind Namadevan, Bangalore (IN); Weize Kang, Mason, OH (US); Hari Shankar Thakur, Bangalore (IN); Arnab Sen, Bangalore (IN); Mayur Ghawat, Pune (IN)

(73) Assignee: General Electric Company, Schenectady, NY (US)

( * ) Notice: Subject to any disclaimer, the term of this patent is extended or adjusted under 35 U.S.C. 154(b) by 268 days.

(21) Appl. No.: 16/155,107

(22) Filed: Oct. 9, 2018

(65) Prior Publication Data

US 2020/0109639 A1  Apr. 9, 2020

(51) Int. Cl.
| | |
|---|---|
| *F02C 7/18* | (2006.01) |
| *F01D 9/06* | (2006.01) |
| *F01D 25/12* | (2006.01) |
| *F01D 25/24* | (2006.01) |
| *F02C 3/04* | (2006.01) |
| *F28D 15/02* | (2006.01) |
| *F02K 3/04* | (2006.01) |

(52) U.S. Cl.
CPC ............... *F01D 9/06* (2013.01); *F01D 25/12* (2013.01); *F01D 25/24* (2013.01); *F02C 3/04* (2013.01); *F02C 7/18* (2013.01); *F02C 7/185* (2013.01); *F28D 15/0233* (2013.01); *F02K 3/04* (2013.01); *F05D 2220/323* (2013.01); *F05D 2220/3212* (2013.01); *F05D 2240/15* (2013.01); *F05D 2260/208* (2013.01); *F05D 2260/232* (2013.01)

(58) Field of Classification Search
CPC .......................... F05D 2260/208; F02C 7/185
USPC .......................................................... 60/730
See application file for complete search history.

(56) References Cited

U.S. PATENT DOCUMENTS

| | | | | |
|---|---|---|---|---|
| 3,429,122 | A * | 2/1969 | Pravda ...................... | F02C 7/08 60/487 |
| 3,651,645 | A * | 3/1972 | Grieb ........................ | F02C 7/14 60/262 |
| 3,842,596 | A * | 10/1974 | Gray ....................... | F01D 5/088 60/736 |
| 4,029,142 | A * | 6/1977 | Van Beukering ....... | F02G 1/057 165/104.26 |
| 5,181,728 | A * | 1/1993 | Stec ...................... | F16J 15/4472 277/355 |
| 6,250,061 | B1 * | 6/2001 | Orlando ................... | F02C 3/13 60/772 |
| 6,295,803 | B1 * | 10/2001 | Bancalari ................. | F02C 7/08 60/39.511 |
| 6,994,516 | B2 | 2/2006 | Takahashi et al. | |
| 7,443,066 | B2 | 10/2008 | Salamah et al. | |
| 8,475,112 | B1 | 7/2013 | Ryznic et al. | |
| 8,884,480 | B2 | 11/2014 | Pal et al. | |
| 8,926,272 | B2 | 1/2015 | Schank et al. | |
| 8,985,517 | B2 | 3/2015 | Ehinger et al. | |
| 9,331,552 | B2 | 5/2016 | Fedoseyev et al. | |

(Continued)

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a system for mitigating rotor bow at a turbine engine. The system includes a casing circumferentially surrounding a rotor assembly in which a heat pipe is attached to the casing and extended circumferentially around the rotor assembly.

22 Claims, 6 Drawing Sheets

(56) References Cited

U.S. PATENT DOCUMENTS

| | | | |
|---|---|---|---|
| 9,671,172 B2 | 6/2017 | Pal et al. | |
| 10,443,388 B2* | 10/2019 | Pal | F01D 19/00 |
| 2008/0141954 A1* | 6/2008 | Norris | F02C 7/18 |
| | | | 123/41.21 |
| 2009/0169359 A1* | 7/2009 | Murphy | F02K 1/46 |
| | | | 415/115 |
| 2010/0236217 A1* | 9/2010 | Venkataramani | F01D 25/125 |
| | | | 60/266 |
| 2013/0186102 A1* | 7/2013 | Lo | F02C 7/141 |
| | | | 60/785 |
| 2014/0165570 A1* | 6/2014 | Herring | F02C 7/14 |
| | | | 60/730 |
| 2014/0245714 A1* | 9/2014 | Falempin | F02C 3/14 |
| | | | 60/39.52 |
| 2015/0068210 A1* | 3/2015 | Drake | F02C 7/18 |
| | | | 60/740 |
| 2016/0108748 A1* | 4/2016 | Harris | F01D 9/04 |
| | | | 415/177 |
| 2016/0215633 A1* | 7/2016 | Drake | F01D 9/065 |
| 2016/0290233 A1* | 10/2016 | Ekanayake | F01D 5/18 |
| 2017/0159566 A1 | 6/2017 | Sennoun et al. | |
| 2017/0214294 A1 | 7/2017 | Menon et al. | |
| 2017/0363094 A1* | 12/2017 | Kumar | F01D 9/065 |
| | | | 60/806 |
| 2018/0023475 A1* | 1/2018 | Xu | F01D 9/065 |
| | | | 60/806 |
| 2018/0058259 A1* | 3/2018 | Sharma | F28D 15/0275 |
| 2018/0179896 A1* | 6/2018 | Pal | F01D 5/085 |
| 2018/0209342 A1* | 7/2018 | Pearson | F01D 21/00 |
| 2018/0306060 A1* | 10/2018 | Ranjan | F02C 7/16 |
| 2018/0372112 A1* | 12/2018 | Prabhudharwadkar | |
| | | | F04D 29/124 |
| 2019/0309685 A1* | 10/2019 | Stillman | F02C 7/30 |
| 2019/0368421 A1* | 12/2019 | Sweidan | F01D 25/12 |
| 2019/0376701 A1* | 12/2019 | Jeong | F28F 1/30 |

* cited by examiner

HEAT PIPE IN TURBINE ENGINE

FIELD

The present invention relates generally to structures for mitigating rotor bow at turbine engines.

BACKGROUND

Advances in turbine engine aero- and thermodynamic performance have led to increasingly larger thermal gradients across turbine engine rotating components. Larger thermal gradients, as well as the turbine engine duty cycle, induce high cycle fatigue (HCF) and low cycle fatigue (LCF), ultimately reducing the structural life of rotating components. Additionally, thermal gradients are at least partially responsible for thermal bowing, or bowed rotor, in rotating components such as shafts, due to asymmetric cooling following turbine engine shutdown.

HCF, LCF, and bowed rotor may result in rotating component failure during turbine engine operation or necessitate replacement of the rotating components at smaller intervals, thereby increasing turbine engine operating costs. HCF, LCF, and bowed rotor may also induce damage to other turbine engine components, such as bearings and casings, due to deformation of adjacent rotating components, which may result in decreased turbine engine efficiency, performance, and structural life.

Increasing rotating component thicknesses, using denser materials, and directing cooler air from the propulsive thermodynamic cycle to rotating components are known to reduce thermal gradients, thereby increasing structural life and mitigating bowed rotor. Additionally, instituting a longer cool-down period during turbine engine shutdown or between shutdown and restart is known to mitigate bowed rotor. However, directing air from the propulsive thermodynamic cycle and using thicker or denser materials reduces turbine engine efficiency and increases fuel consumption by reducing the energy available for, or requiring additional energy for, propulsive thrust. Furthermore, longer cooldown regimes increase the amount of time before the turbine engine can be restarted, which may have an economic affect similar to reduced engine efficiency or increased fuel consumption.

Other known solutions include rotor turning systems, such as to expose cooler portions of the rotor to warmer temperatures, and warmer portions of the rotor to cooler temperatures, thereby decreasing the thermal gradient at the rotor and mitigating rotor bow. However, such systems may include complex hardware or software to rotate the rotor while the engine is shutdown. Such complexities may offset or eliminate rotor bow mitigation advantages by adding weight, complexity, and reducing efficiency of the engine.

Therefore, there is a need for structures for mitigating rotor bow while mitigating adverse effects to turbine engine performance, efficiency, and economics.

BRIEF DESCRIPTION

Aspects and advantages of the invention will be set forth in part in the following description, or may be obvious from the description, or may be learned through practice of the invention.

The present disclosure is directed to a system for mitigating rotor bow at a turbine engine. The system includes a casing circumferentially surrounding a rotor assembly in which a heat pipe is attached to the casing and extended circumferentially around the rotor assembly.

In one embodiment, the heat pipe is inseparably attached to the casing.

In another embodiment, the casing includes a plurality of the heat pipe in axially adjacent arrangement.

In various embodiments, the heat pipe is attached to an inner diameter of the casing. In one embodiment, the system includes the heat pipe attached to the inner diameter of the casing, the rotor assembly radially inward of the heat pipe, and a fluid in thermal communication directly between the heat pipe and the rotor assembly. In another embodiment, the heat pipe is attached to the inner diameter of the casing and directly adjacent to an outer diameter of the rotor assembly.

In one embodiment, the system includes a braze material between the heat pipe and an inner diameter of the casing.

In various embodiments, the heat pipe includes an outer perimeter wall comprising a working fluid and a capillary tube therewithin. In one embodiment, the working fluid includes cesium, potassium, or sodium, or combinations thereof. In another embodiment, the working fluid includes helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, lithium, silver, or combinations thereof.

Another aspect of the disclosure is directed to a turbine engine including a system for mitigating rotor bow. The turbine engine includes a rotor assembly, a casing circumferentially surrounding the rotor assembly, and a heat pipe attached to the casing and extended circumferentially around the rotor assembly. The heat pipe is disposed in thermal communication with a fluid directly between the rotor assembly and the heat pipe.

In various embodiments, the turbine engine further includes a combustion section circumferentially surrounding at least a portion of the rotor assembly. The casing is extended between a compressor exit guide vane and a turbine nozzle vane. In one embodiment, the heat pipe is attached to the casing between the compressor exit guide vane and the turbine nozzle vane. In another embodiment, the casing includes a plurality of the heat pipe extended circumferentially at the casing and in axially adjacent arrangement between the compressor exit guide vane and the turbine nozzle vane.

In still various embodiments, the heat pipe is attached to an inner diameter of the casing. In one embodiment, the heat pipe is attached to the inner diameter of the casing and adjacent to an outer diameter of the rotor assembly. In another embodiment, a cavity is defined between the outer diameter of the rotor assembly and the inner diameter of the casing. The fluid in the cavity is in direct fluid communication with the heat pipe and the outer diameter of the rotor assembly.

In one embodiment, the engine further includes a braze material between the heat pipe and an inner diameter of the casing.

In another embodiment, the heat pipe includes an outer perimeter wall in which the fluid is in thermal communication with the outer perimeter wall and the rotor assembly. A working fluid is disposed within the heat pipe. A capillary tube is within the outer perimeter wall. A vapor cavity is defined inward of the capillary tube. In one embodiment, the working fluid includes cesium, potassium, sodium, helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, lithium, silver, or combinations thereof.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of an engine including structures for mitigating rotor bow while further mitigating adverse effects to engine performance, efficiency, and economics are generally provided. The embodiments of the engine generally provided herein may reduce or eliminate complex hardware or software system for rotating the rotor to mitigate or eliminate rotor bow. The embodiment generally provided herein provides a passive structure and system for mitigating rotor bow at a rotor assembly of the engine. The structures include a heat pipe disposed at an inner diameter of a casing proximate or otherwise in direct thermal and fluid communication with a rotor assembly adjacent to the heat pipe. The passive structure of the embodiments generally provided herein may enable heat transfer following shutdown of the engine. Exemplary embodiments enable heat transfer of a relatively small delta temperature between a 6 o'clock or bottom dead center (BDC) position and a 12 o'clock or top dead center (TDC) position. In one exemplary embodiment, the heat pipe at the casing enables heat transfer of a delta temperature of approximately degrees 100 F such as to mitigate formation of rotor bow following shutdown of the engine. Embodiments of the engine generally provided herein may provide benefits over known systems and structures for mitigating rotor bow, such as by eliminating components and controls necessary for an active system of rotating the rotor assembly, thereby reducing system complexity, weight, potential sources of error or failure, reduce engine downtime after shutdown such as to improve cost and overall economics of engine and aircraft operation, or otherwise improve engine efficiency.

Figure 1:
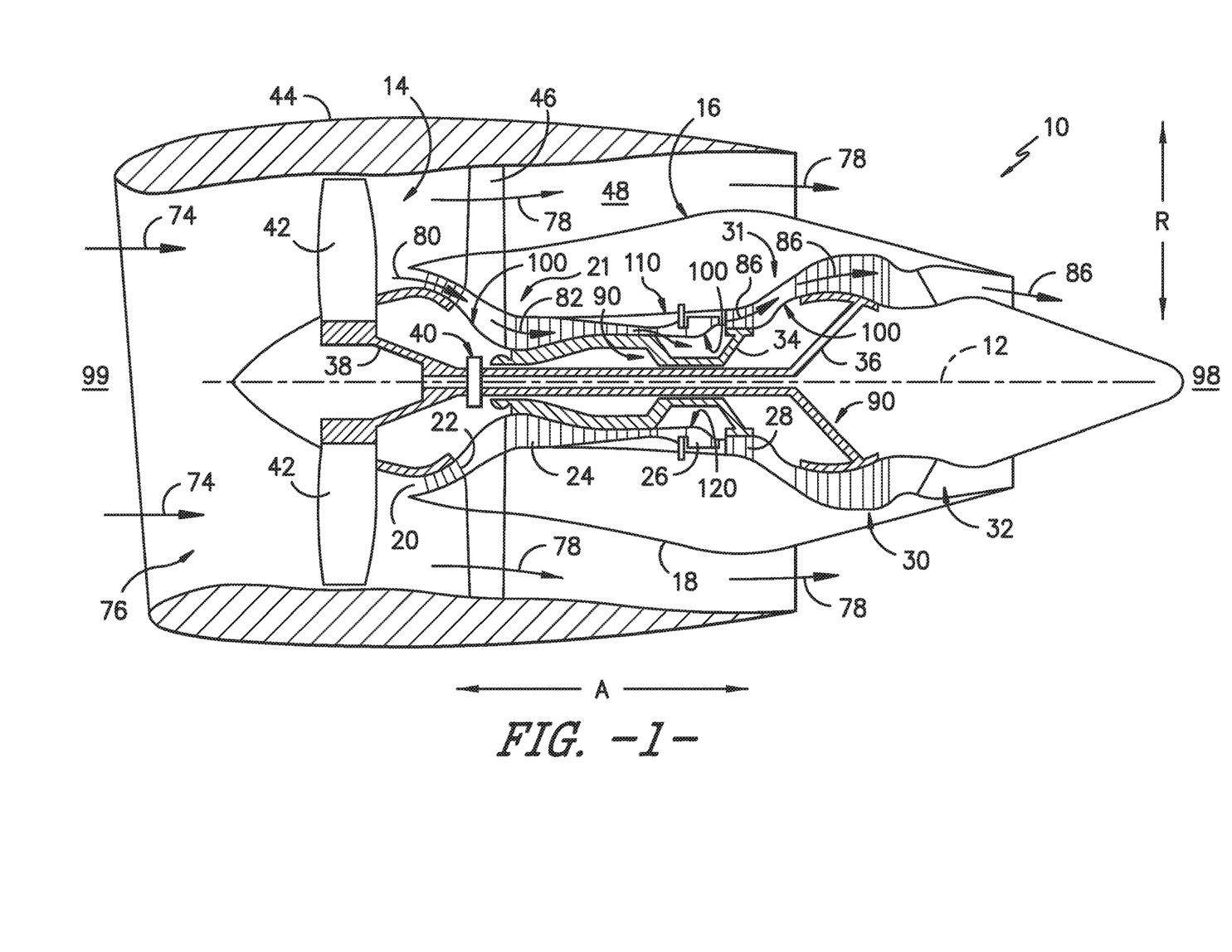
FIG. 1 is a schematic cross sectional view of an exemplary heat engine incorporating an exemplary embodiment of a bowed rotor mitigation system according to an aspect of the present disclosure.

Referring now to the drawings, FIG. 1 is a schematic partially cross-sectioned side view of an exemplary turbo machine or heat engine 10 herein referred to as "engine 10" as may incorporate various embodiments of the present disclosure. Although further described below with reference to a turbofan engine, the present disclosure is also applicable to turbomachinery in general, including turbojet, turboprop, and turboshaft gas turbine engines or steam turbine engines, including marine and industrial turbine engines and auxiliary power units, or Brayton cycle machines generally including a rotor assembly. As shown in FIG. 1, the engine 10 has a longitudinal or axial centerline axis 12 that extends there through for reference purposes. A reference axial direction A co-directional to the axial centerline axis 12 is provided. A reference radial direction R extended from the axial centerline axis 12 is also provided. The engine 10 further defines a reference upstream end 99 and a downstream end 98 generally indicating an axial direction of flow through the engine 10.

In general, the engine 10 may include a fan assembly 14 and a core engine 16 disposed downstream from the fan assembly 14. The core engine 16 may generally include a substantially tubular outer core casing 18 that defines an annular inlet 20. The outer core casing 18 encases or at least partially forms, in serial flow relationship, a compressor section 21 having a booster or low pressure (LP) compressor 22, a high pressure (HP) compressor 24, a combustion section 26, a turbine section 31 including a high pressure (HP) turbine 28, a low pressure (LP) turbine 30 and a jet exhaust nozzle section 32. The outer core casing 18 defines an inlet opening 20 through which a flow of air 80 enters the core engine 16.

A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40 such as in an indirect-drive or geared-drive configuration. In other embodiments, the engine 10 may further include an intermediate pressure (IP) compressor and turbine rotatable with an intermediate pressure shaft.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. In one embodiment, the nacelle 44 may be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Combinations of the fan assembly 14, the compressor section 21, and the turbine section 31 may define one or more rotor assemblies 90 of the engine 10. In various embodiments, the HP compressor 24, the HP turbine 28, and the HP shaft 34 together include the rotor assembly 90 defining an HP rotor assembly. In another embodiment, the LP compressor 22, the LP turbine 30, and the LP shaft 36 together include the rotor assembly 90 defining an LP rotor assembly. In still another embodiment, the rotor assembly 90 defining the LP rotor assembly may further include the fan shaft 38, the fan hub 42, and the fan blades 40. In still yet other embodiments, the rotor assembly 90 may define an IP rotor assembly including the IP compressor and the IP turbine (not shown).

Figure 2:
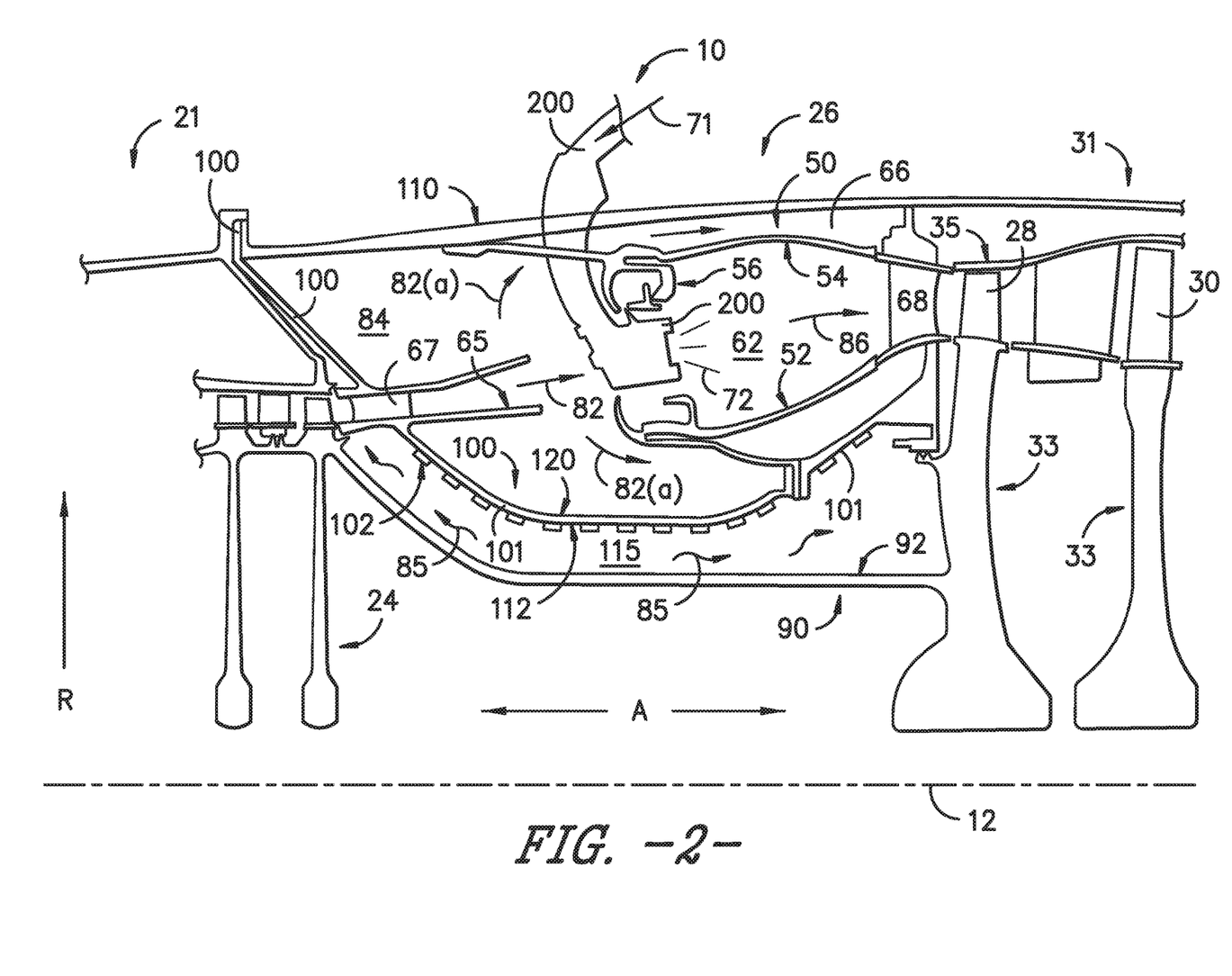
FIG. 2 is an axial cross sectional view of an exemplary embodiment of a combustion section of the exemplary engine shown in FIG. 1 according to an aspect of the present disclosure.

FIG. 2 is a cross sectional side view of an exemplary combustion section 26 of the core engine 16 as shown in FIG. 1. As shown in FIG. 2, the combustion section 26 may generally include an annular type combustor assembly 50 having an annular inner liner 52, an annular outer liner 54 and a bulkhead 56 that extends radially between upstream ends of the inner liner 52 and the outer liner 54 respectfully. In other embodiments of the combustion section 26, the combustor assembly 50 may be a can or can-annular type. As shown in FIG. 2, the inner liner 52 is radially spaced from the outer liner 54 with respect to axial centerline 12 (FIG. 1) and defines a generally annular combustion chamber 62 therebetween. In particular embodiments, the inner liner 52 and/or the outer liner 54 may be at least partially or entirely formed from metal alloys or ceramic matrix composite (CMC) materials.

An outer flow passage 66 may be defined around the inner liner 52 and/or the outer liner 54, such as between the liners 52, 54 and an outer diffuser case 110 and inner diffuser case 120 of the combustion section 26. The outer diffuser case 110 and the inner diffuser case 120 may together define a pressure vessel around the combustor assembly 50. The inner liner 52 and the outer liner 54 may extend from the bulkhead 56 towards an inlet or turbine nozzle vane 68 to the HP turbine 28, thus at least partially defining a hot gas path between the combustor assembly 50 and the HP turbine 28. A fuel nozzle 200 may extend at least partially through the bulkhead 56 and provide a fuel-air mixture 72 to the combustion chamber 62. In various embodiments the fuel nozzle 200 is extended through the outer diffuser case 110 and attached thereto.

During operation of the engine 10, as shown in FIGS. 1 and 2 collectively, a volume of air as indicated schematically by arrows 74 enters the engine 10 through an associated inlet 76 of the nacelle 44 and/or fan assembly 14. As the air 74 passes across the fan blades 42 a portion of the air as indicated schematically by arrows 78 is directed or routed into the bypass airflow passage 48 while another portion of the air as indicated schematically by arrow 80 is directed or routed into the LP compressor 22. Air 80 is progressively compressed as it flows through the LP and HP compressors 22, 24 towards the combustion section 26. As shown in FIG. 2, the now compressed air as indicated schematically by arrows 82 flows across a compressor exit guide vane (CEGV) 67 and through a prediffuser 65 into a diffuser cavity or head end portion 84 of the combustion section 26.

The prediffuser 65 and CEGV 67 condition the flow of compressed air 82 to the fuel nozzle 200. The compressed air 82 pressurizes the diffuser cavity 84. The compressed air 82 enters the fuel nozzle 200 to mix with a fuel 71. The fuel nozzle 200 mixes fuel 71 and air 82 to produce a fuel-air mixture 72 exiting the fuel nozzle 200. After premixing the fuel 71 and air 82 at the fuel nozzle 200, the fuel-air mixture 72 burns in the combustion chamber 62 to generate combustion gases 86 to drive rotation of the rotors at the turbine section 31.

Typically, the LP and HP compressors 22, 24 provide more compressed air to the diffuser cavity 84 than is needed for combustion. Therefore, a second portion of the compressed air 82 as indicated schematically by arrows 82(a) may be used for various purposes other than combustion. For example, as shown in FIG. 2, compressed air 82(a) may be routed into the outer flow passage 66 to provide cooling to the inner liner 52 and outer liner 54. In addition or in the alternative, at least a portion of compressed air 82(a) may be routed out of the diffuser cavity 84. For example, a portion of compressed air 82(a) may be directed through various flow passages to provide cooling air to at least one of the HP turbine 28 or the LP turbine 30.

Referring back to FIGS. 1 and 2 collectively, the combustion gases 86 generated in the combustion chamber 62 flow from the combustor assembly 50 into the HP turbine 28, thus causing the HP rotor shaft 34 to rotate, thereby supporting operation of the HP compressor 24. As shown in FIG. 1, the combustion gases 86 are then routed through the LP turbine 30, thus causing the LP rotor shaft 36 to rotate, thereby supporting operation of the LP compressor 22 and/or rotation of the fan shaft 38. The combustion gases 86 are then exhausted through the jet exhaust nozzle section 32 of the core engine 16 to provide propulsive thrust.

In one embodiment of the engine 10, the air 80, 82 flowing through the core flowpath as it exits the compressor section 21 and enters the combustion section 26 may approach or exceed 1200 F. The resulting combustion gases 86 in the combustion section 26 may approach or exceed 3300 F before mixing with non-combusted air (e.g., cooling air generally, or quench air, etc.) before entering the turbine section 31. The resulting combustion gases 86 in the core flowpath at the HP turbine 28 may approach or exceed 2500 F.

The engine 10 may undergo a duty cycle due to their regular cyclical use or operation. In one embodiment, the engine 10 defines a commercial aircraft engine and may generally undergo a duty cycle including taxi, takeoff, climb, cruise, approach, and landing. At takeoff, the engine 10 may produce a maximum takeoff thrust, followed by lesser thrust levels, with the lowest in-flight thrust level at flight idle, and the lowest thrust level above shutdown being ground idle. As the engine 10 goes through each phase of the cycle, the temperatures of the air 80, 82, 86 in the core flowpath increases and decreases over time and thrust condition. Furthermore, though temperatures in the core flowpath and, subsequently, the portions of the rotor assembly 90 in the core flowpath (e.g., rotor blades, disks, etc.) become hotter as pressure increases and the air 80, 82 becomes combustion gases 86, temperatures are generally much lower at the radially inward portions of the rotor assembly 90, such as at one or more shafts, 34, 36, 38. The differences in temperature within the engine 10 and across the rotor assembly 90, as well as changes in the differences in temperature, define a thermal gradient that influences the structural life of rotor assembly 90 and surrounding static components in the engine 10.

Large thermal gradients may warp the rotor assembly 90, such as to induce bending or bowing, or rotor bow, or bowed rotor condition. The rotor assembly 90 defining a bowed rotor condition may define relatively large non-concentricity, or eccentricity, relative to the centerline axis 12 and a casing 100 circumferentially surrounding the rotor assembly 90, such that radially outward portions of the rotor assembly 90 (e.g., blade tips) may unacceptably contact or rub against a surrounding casing or shroud. In other instances, the bowed rotor condition may induce unacceptably high vibrations at bearing assemblies, thereby increasing wear and reducing structural life.

Figure 3:
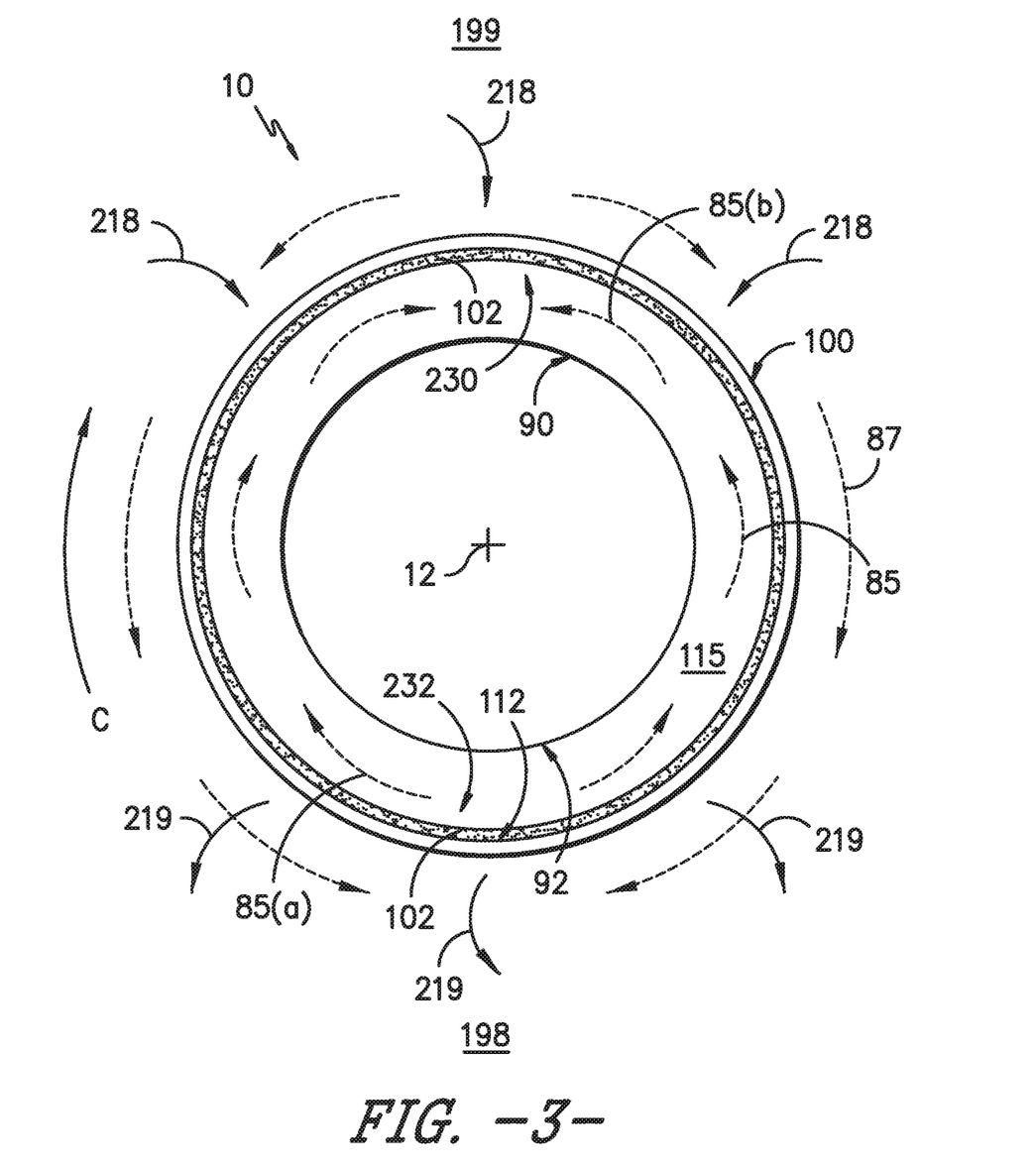
FIG. 3 is a cross sectional view of an exemplary embodiment of a casing, heat pipe, and rotor assembly of the engine generally shown in FIG. 1 according to an aspect of the present disclosure.

Referring now to FIG. 2, to reduce thermal gradients, or generally mitigate or eliminate bowed rotor conditions at the rotor assembly 90, the engine 10 includes a heat pipe 102 attached to the casing 100. The heat pipe 102 is extended circumferentially around the rotor assembly 90 (such as depicted in FIG. 3). The heat pipe 102 is disposed in thermal communication with a fluid, such as depicted schematically by arrows 85, directly between the rotor assembly 90 and the heat pipe 102. In various embodiments, such as depicted in FIG. 2, the heat pipe 102 is attached to an inner diameter 112 of the casing 100. The heat pipe 102 is further disposed in a cavity 115 between the rotor assembly 90 and the inner diameter 112 of the casing 100.

In particular embodiments, the fluid 85 in the cavity 115 is in direct thermal communication with the heat pipe 102 and the rotor assembly 90. In one embodiment, the fluid 85 is in direct thermal communication with the heat pipe 102 and an outer diameter 92 of the rotor assembly 90. In another embodiment, the fluid 85 is in direct thermal communication with the heat pipe 102 and the outer diameter 92 of the rotor assembly 90 directly inward along the radial direction R from the heat pipe 102. In yet another embodiment, the fluid 85 is in direct fluid communication with the heat pipe 102 and the outer diameter 92 of the rotor assembly 90. Stated alternatively, various embodiments of the heat pipe 102 are attached to the inner diameter 112 of the casing 100 adjacent to the outer diameter 92 of the rotor assembly 90 with only the fluid 85 therebetween.

Various embodiments of the engine 10 may include a plurality of the heat pipe 102 in adjacent arrangement along the axial direction A, such as depicted in regard to FIG. 2. In one embodiment, the casing 100 is included in the combustion section 26 of the engine 10. The casing 100 may surround a portion of the rotor assembly 90 inward along the radial direction R of the combustion section 26 (i.e., substantially between the compressor section 21 and the turbine section 31). In one embodiment, the heat pipe 102, or a plurality thereof, is attached to a portion 101 of the casing 100 between the CEGV 67 and the turbine nozzle vane 68. Referring still to FIG. 2, various embodiments of the casing 100 including the heat pipe 102 may include the inner diffuser casing 120 of the combustion section 26. In one embodiment, the casing 100 including the heat pipe 102 is extended along the axial direction A from the CEGV 67 to the turbine nozzle 68. In various embodiments, the heat pipe 102, or plurality thereof, are attached to the casing 100 defining the inner diffuser casing 120 between the CEGV 67 and the turbine nozzle vane 68, and inward along the radial direction R of the outer diffuser casing 110 surrounding the inner diffuser casing 120.

The portion 101 of casing 100 may define substantially high temperatures, such as heat transferred from the air 82 entering the combustion section 26 from the compressor section 21, or from the combustion gases 86 at the combustion chamber 62, and further such as described above. The substantially high temperatures at the rotor assembly 90 from heat transferred radially inward corresponding to the portion 101 from the combustion section 26 may induce rotor bow at the rotor assembly 90. For example, the rotor bow at the rotor assembly 90 may result from thermal gradients at the rotor assembly 90, such as radially inward of the combustion section 26 in contrast to radially inward of the turbine section 31 or the compressor section 21, or such as relative to a lower portion 198 (e.g., lower half) of the engine 10 in contrast to an upper portion 199 (e.g., upper half) of the engine 10, such as depicted in regard to FIG. 3.

Figure 4:
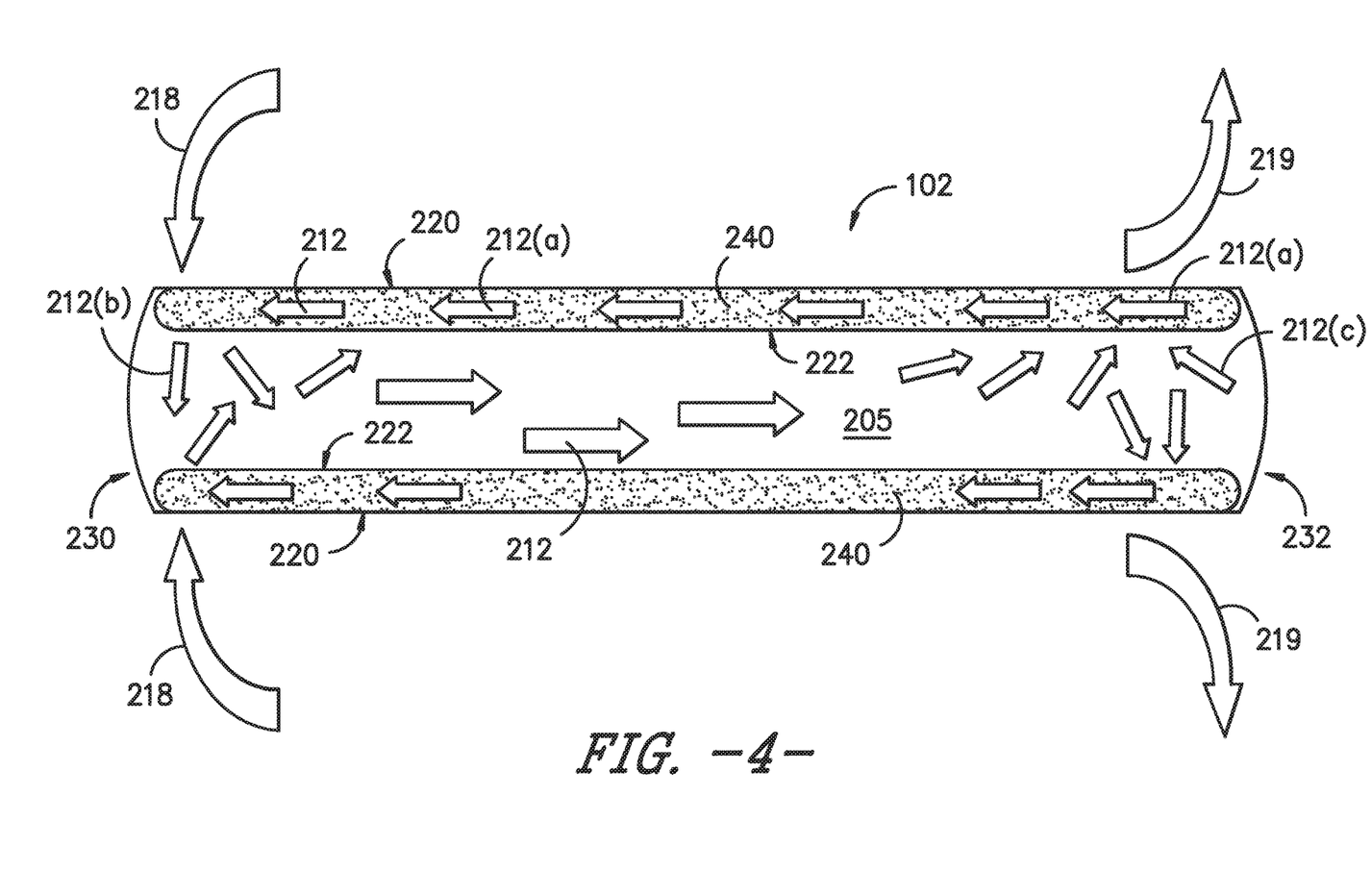
FIG. 4 is a schematic exemplary embodiment of a heat pipe of the engine generally shown in regard to FIGS. 1-3 according to an aspect of the present disclosure.
Figure 5:
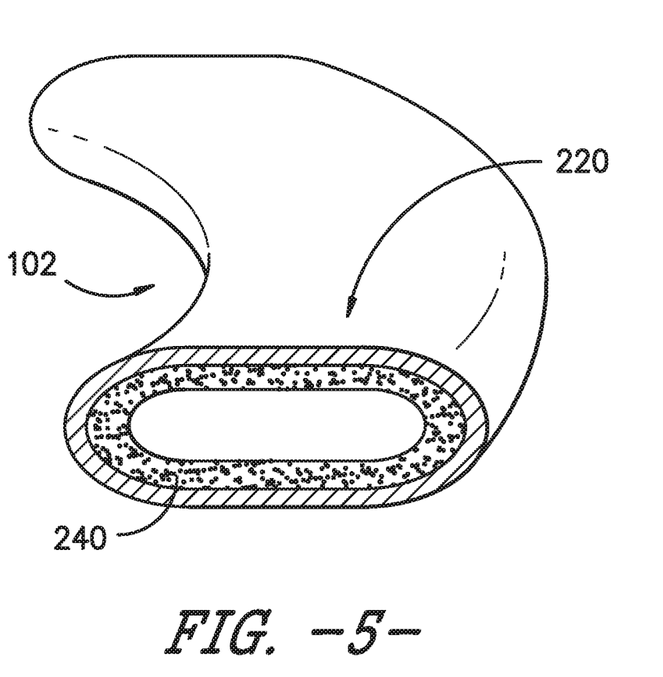
FIG. 5 is a perspective cutaway view of an exemplary embodiment of the heat pipe generally shown in regard to FIG. 4.

Referring now to FIGS. 4-5, schematic cross sectional views of an exemplary heat pipe 102 are generally provided. The heat pipe 102 includes a working fluid 212, depicted schematically by arrows 212, and an outer perimeter wall 220. The outer perimeter wall 220 defines an enclosed vapor cavity 205, such as, e.g. an annulus. The heat pipe 102 includes an evaporator portion 230 disposed at the upper portion 199 (FIG. 3) of the engine 10 and a condenser portion 232 disposed at the lower portion 198 (FIG. 3) of the engine 10. In one embodiment, the heat pipe 102 may further define an inner perimeter wall 222 inward of the outer perimeter wall 220. A capillary tube 240 is defined inward of the outer perimeter wall 220. Various embodiments of the capillary tube 240 may define a wick structure, such as a screen wick, or open channels or grooves extending from the outer perimeter wall 220, or a plurality of arteries or tubes, or a corrugated screen, or combinations thereof. In various embodiments, the capillary tube 240 may be defined between the outer perimeter wall 220 and the inner perimeter wall 222. In one embodiment, inward of the capillary tube 240 the vapor cavity 205 is defined. In another embodiment, inward of the capillary tube 240 and the inner perimeter wall 222, the vapor cavity 205 is defined.

Referring to FIGS. 2-5, integrating the heat pipe 102 into or onto the inner surface 112 of the casing 100 may provide passive thermal management to reduce the thermal gradient at the rotor assembly 90 by transferring heat emitted from the upper portion 199 of the rotor assembly 90 (i.e., thermally proximate to the evaporator end 230 of the heat pipe 102) to the lower portion 198 of the rotor assembly 90 (i.e., thermally proximate to the condenser end 232 of the heat pipe 102). The heat pipe 102 combines thermal conductivity and phase transition to efficiently manage heat transfer by employing evaporative cooling to transfer thermal energy from the evaporator end 230 of the heat pipe 102 to the condenser end 232 of the heat pipe 102 by a cycle of evaporation and condensation of the working fluid 212.

In various embodiments, thermal energy 218 generated during operation of the engine 10, such as that which may emit from the combustion section 26 such as described above, is transferred to the evaporator end 230 of the heat pipe 102, which heats the working fluid depicted via arrows 212(a) at the evaporator end and evaporates within the heat pipe 102 to become a vapor phase working fluid, such as depicted via arrows 212(b), within the vapor cavity 205 of the heat pipe 102. The vapor phase working fluid 212(b)

transfers thermal energy from the evaporator end 230 to the condenser end 232 of the heat pipe 102, and as such, from the upper portion 199 of the engine 10 and the rotor assembly 90 thermally proximate to the evaporator end 230 of the heat pipe 102 to the lower portion 198 of the engine 10 and the rotor assembly 90 thermally proximate to the condenser end 232 of the heat pipe 102. The vapor phase working fluid 212(b) cools and condenses, such as depicted at arrows 212(c), into the liquid phase working fluid 212(a) at the capillary tube 240 at the condenser end 232.

It should be appreciated that the casing 100 including the heat pipe 102 shown in FIGS. 4-5 and further described herein may further define an approximately adiabatic section between the evaporator end 230 and the condenser end 232 in which thermal energy is neither entering nor exiting the heat pipe in significant magnitude.

Referring to FIGS. 3-4, the sectional view of the engine 10 further depicts a flow of thermal energy of the fluid 85 within the cavity 115 between the casing 100 and the rotor assembly 90. In various embodiments, the relatively cooler fluid 85(a) at the lower portion 198 of the engine 10 and rotor assembly 90 enables condensation of the working fluid 212(c) (FIG. 4) and the relatively warmer fluid 85(b) at the upper portion 199 of the engine 10 and the rotor assembly 90 enables evaporation of the working fluid 212(b) (FIG. 4) within the heat pipe 102. The flow of thermal energy through the heat pipe 102, depicted via arrows 87 (depicted outside the heat pipe for clarity), is then from the upper portion 199 of the engine 10 and rotor assembly 90 to the lower portion 198 of the engine 10 and rotor assembly 90. As such, thermal energy 218 from the engine 10 surrounding the rotor assembly 90 is provided to the heat pipe 102 at the evaporator portion 230 and is transferred to the condenser portion 232 and released, such as depicted via arrows 219. The flow of thermal energy from the relatively warmer upper portion 230 of the rotor assembly 90 to the relatively cooler lower portion 232 of the rotor assembly 90 enables lowering a difference in high and low temperatures, or the thermal gradient, at the rotor assembly 90. As such, bowing of the rotor assembly 90 may be mitigated or eliminated via the passive heat transfer structure of the heat pipe 102 at the casing 100 surrounding the rotor assembly 90.

Referring still to FIGS. 4-5, the working fluid 212 in the heat pipe 102 is a two-phase fluid that may operate within the desired temperature range of the heat pipe 102 at the engine 10, such as described above in regard to the combustion section 26. However, it should be appreciated that the heat pipe 102 may be disposed at the casing 100 at other portions of the engine 10, such as, but not limited to, the compressor section 21, the turbine section 31, or the exhaust nozzle 32.

At the evaporator end 230 of heat pipe 102, the working fluid 212 should evaporate, while at the condenser end 232 the working fluid 212 should condense. In various embodiments, the working fluid 212 in the heat pipe 102 includes, but is not limited to, helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, cesium, potassium, sodium, lithium, silver, or combinations thereof.

Additionally, the desired working fluid 212 is at least partially a function of the material of the heat pipe 102, such as the outer perimeter wall 220, in which the working fluid 212 resides. In one embodiment, casing 100 is a first material and the outer perimeter wall 220 of the heat pipe 102 is a second material of a different composition than the first material. The inclusion of a different material composition for the outer perimeter wall 220 of the heat pipe 102 may enable certain working fluids 212 to be employed that are incompatible with materials such as, for example, titanium, titanium alloys, nickel, or nickel alloys.

In various embodiments the first material of the casing 100 may be a titanium alloy, a nickel alloy, or a composite material. The second material of the outer perimeter wall 220 of the heat pipe 102 may be aluminum. Compatible working fluids 212 may include ammonia, trichlorofluoromethane, trichlorotrifluoroethane, dichlorofluoromethane, heptane or combinations thereof. As another non-limiting example, in another embodiment the second material of the outer perimeter wall 220 may be a stainless steel. Compatible working fluids 212 may include water, methanol, sodium, cesium, or mercury.

In an embodiment in which the casing 100 is a first material and the outer perimeter wall 220 of the heat pipe 102 is a second material, the heat pipe 102 may be attached onto the surface 112 of the casing 100, or integrally cast between the surfaces 112 of the casing 100, or attached by way of additive manufacturing, welding, brazing, bonding, or a mechanical fastener. The surfaces 112 of the casing 100 may define a groove, slot, cavity, or treated surface onto or between which the heat pipe 102 including the outer perimeter wall 220 may position.

It should be appreciated, however, that the heat pipe 102 installed onto the surface 112 of the casing 100, or between the surfaces 112 of the casing 100, including the outer perimeter wall 220 of the heat pipe 102, may include other materials, such as, but not limited to, steel, stainless steel, copper, silica, nickel, titanium, aluminum, iron, brass, tungsten, tantalum, molybdenum, niobium, or alloys or combinations of each or thereof.

Figure 6:
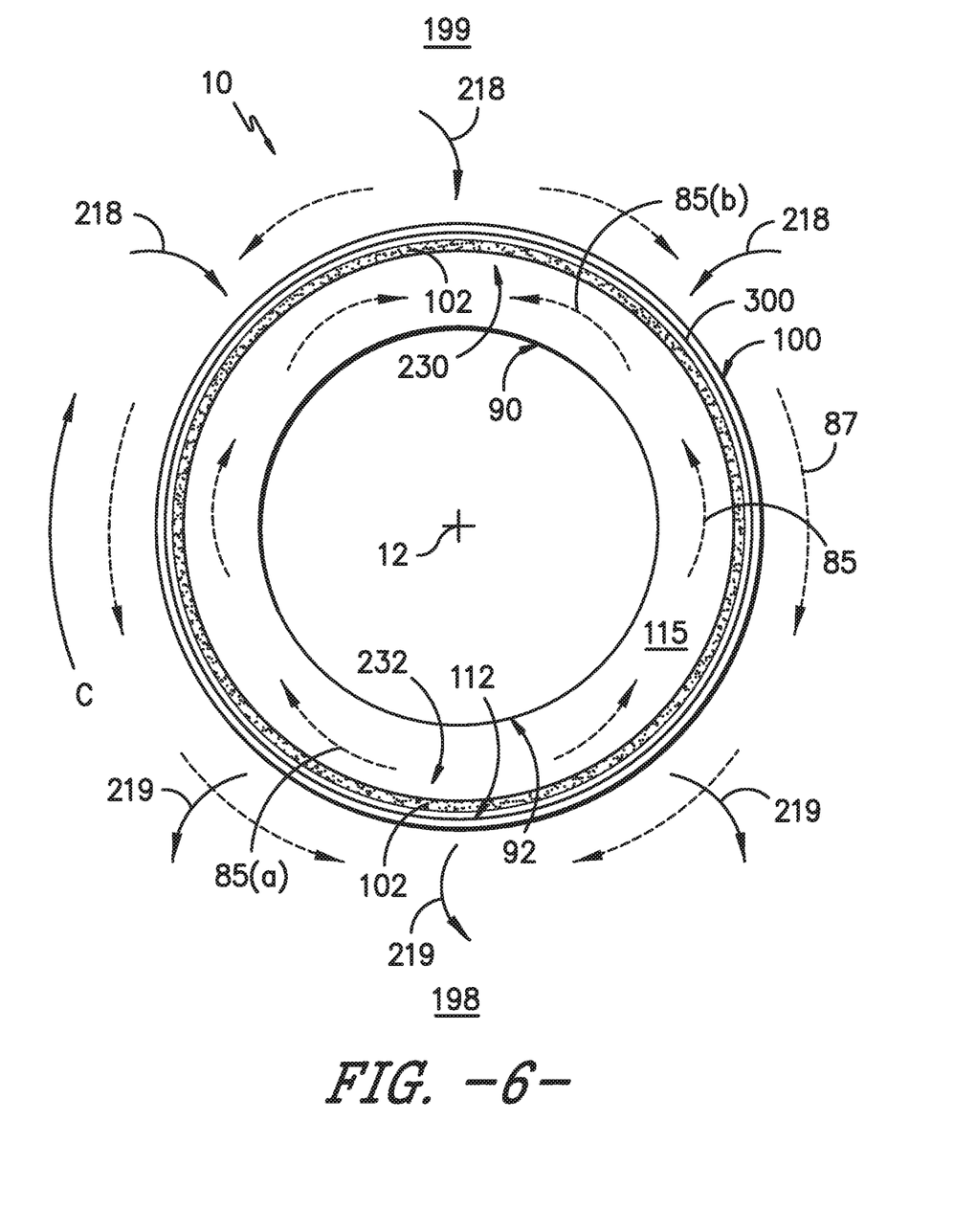
FIG. 6 is a cross sectional view of another exemplary embodiment of a casing, heat pipe, and rotor assembly of the engine generally shown in FIG. 1 according to another aspect of the present disclosure.

Referring briefly to FIG. 6, another exemplary cross section of an embodiment of the engine 10 is generally provided. The engine 10 may be configured substantially similarly such as shown and described in regard to FIGS. 1-5. However, in FIG. 6, a layer of a braze material 300 is depicted between the heat pipe 102 and the inner diameter 112 of the casing 100. In various embodiments, the braze material 300 may include aluminum-silicon, copper, copper-silver, copper-zinc, copper-tin, gold-silver, nickel or nickel alloy, silver, iron, silicon, boron, phosphorous, or another suitable filler material based on the material of the outer perimeter wall 220 of the heat pipe 102 and the material of the casing 100.

The heat pipe 102 may be brazed onto the casing 100 using one or more methods including flux, an inert gas environment, a vacuum, or another atmospheric environment, including, but not limited to, a combusted fuel gas, ammonia, hydrogen, nitrogen, carbon monoxide, inert gases, or combinations thereof. The methods may further, or alternatively, include furnace brazing, torch brazing, dip brazing, or another suitable method for brazing the heat pipe 102 to the casing 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for mitigating rotor bow at a turbine engine, the system comprising:
   a casing circumferentially surrounding a rotor assembly,
   wherein a heat pipe is attached to an inner surface of the casing and extends continuously around an entire circumference of the rotor assembly, and
   wherein the heat pipe is structured to force thermal energy from between the inner surface of the casing and the rotor assembly to flow from an uppermost portion of the heat pipe to a lowermost portion of the heat pipe.

2. The system of claim 1, wherein the heat pipe is inseparably attached to the casing.

3. The system of claim 1, wherein the casing comprises a plurality of the heat pipe in axially adjacent arrangement.

4. The system of claim 1, wherein the heat pipe is attached to an inner diameter of the casing.

5. The system of claim 4, wherein the system comprises the heat pipe attached to the inner diameter of the casing, the rotor assembly radially inward of the heat pipe, and a fluid in thermal communication directly between the heat pipe and the rotor assembly.

6. The system of claim 5, wherein the heat pipe is attached to the inner diameter of the casing and directly adjacent to an outer diameter of the rotor assembly.

7. The system of claim 1, further comprising a braze material between the heat pipe and an inner diameter of the casing.

8. The system of claim 1, wherein the heat pipe comprises an outer perimeter wall comprising a working fluid and a capillary tube within the outer perimeter wall.

9. The system of claim 8, wherein the working fluid comprises cesium, potassium, or sodium, or combinations thereof.

10. The system of claim 8, wherein the working fluid comprises helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, lithium, silver, or combinations thereof.

11. The system of claim 1, further comprising:
    a combustion chamber,
    wherein the heat pipe is disposed axially in an upstream direction of the combustion chamber.

12. A turbine engine comprising a system for mitigating rotor bow, the turbine engine comprising:
    a rotor assembly;
    a casing circumferentially surrounding the rotor assembly; and
    a heat pipe attached to an inner surface of the casing and extending continuously around an entire circumference of the rotor assembly,
    wherein the heat pipe is disposed in thermal communication with a fluid directly between the rotor assembly and the heat pipe, and
    wherein the heat pipe is structured to force thermal energy from between the inner surface of the casing and the rotor assembly to flow from an uppermost portion of the heat pipe to a lowermost portion of the heat pipe.

13. The turbine engine of claim 12, further comprising:
    a combustion section circumferentially surrounding at least a portion of the rotor assembly,
    wherein the casing is extended between a compressor exit guide vane and a turbine nozzle vane.

14. The turbine engine of claim 13, wherein the heat pipe is attached to the casing between the compressor exit guide vane and the turbine nozzle vane.

15. The turbine engine of claim 13, wherein the casing comprises a plurality of the heat pipe extended circumferentially at the casing and in axially adjacent arrangement between the compressor exit guide vane and the turbine nozzle vane.

16. The turbine engine of claim 13, wherein the heat pipe is attached to the casing defining an inner diffuser casing of the combustion section.

17. The turbine engine of claim 12, wherein the heat pipe is attached to an inner diameter of the casing and adjacent to an outer diameter of the rotor assembly.

18. The turbine engine of claim 17,
    wherein a cavity is defined between the outer diameter of the rotor assembly and the inner diameter of the casing, and
    wherein fluid in the cavity is in direct fluid communication with the heat pipe and the outer diameter of the rotor assembly.

19. The turbine engine of claim 12, further comprising a braze material between the heat pipe and an inner diameter of the casing.

20. The turbine engine of claim 12, wherein the heat pipe comprises:
    an outer perimeter wall, wherein the fluid is in thermal communication with the outer perimeter wall and the rotor assembly;
    a working fluid disposed within the heat pipe; and
    a capillary tube within the outer perimeter wall, wherein a vapor cavity is defined inward of the capillary tube.

21. The turbine engine of claim 20, wherein the working fluid comprises cesium, potassium, sodium, helium, nitrogen, ammonia, trichlorofluoromethane, dichlorofluoromethane, pentane, trichlorotrifluoroethane, acetone, methanol, perfluoromethylcyclohexane, ethanol, heptane, water, toluene, perfluoromethyldecalin, a diphenyl ether, mercury, lithium, silver, or combinations thereof.

22. The turbine engine of claim 12, further comprising:
    a combustion chamber,
    wherein the heat pipe is disposed axially in an upstream direction of the combustion chamber.

* * * * *